United States Patent Office 3,076,004
Patented Jan. 29, 1963

3,076,004
PREPARATION OF 2-METHYL-3-PHYTYL-1,4-NAPHTHOHYDROQUINONE ESTER
Ralph Franz Hirschmann, Westfield, N.J., assignor to Merck & Co., Inc., Rahway, N.J., a corporation of New Jersey
No Drawing. Filed Jan. 21, 1959, Ser. No. 788,059
2 Claims. (Cl. 260—410.5)

This invention relates to vitamin $K_1$. More particularly, this invention is concerned with novel monocarboxylic acid esters of 2-methyl-3-phytyl-1,4-naphthohydroquinone and processes of producing these compounds. Such compounds possess vitamin $K_1$ activity and are useful intermediates in the synthetic production of vitamin $K_1$ and derivatives thereof.

This application is a continuation-in-part of applications Serial Nos. 403,638, now U.S. Patent 2,906,780, and 403,640, now abandoned, each filed January 12, 1954.

In the usual method for the commercial production of vitamin $K_1$, 2-methyl-1,4-naphthohydroquinone is reacted with phytol at about 80° C. for about 48 hours in the presence of oxalic acid to produce 2-methyl-3-phytyl-1,4-naphthohydroquinone which is subsequently oxidized quantitatively to 2-methyl-3-phytyl-1,4-naphthoquinone (vitamin $K_1$). The described condensation not only requires an undesirably long reaction period which seriously limits production but also restricts the use of equipment employed in the reaction from use in other operations. In addition, this reaction results in formation of appreciable quantities of the undesirable angular by-product, 2-methyl-2-phytyl-1,4-naphthohydroquinone. Most serious, however, is the low yield obtained in this reaction which seldom exceeds about 25% of the desired product. Besides these disadvantages, the resulting 2-methyl-3-phytyl-1,4-naphthohydroquinone must be isolated from various contaminating side products formed in the reaction mixture by tedious and time consuming methods.

An ultimate object of this invention is to provide a method of producing vitamin $K_1$ in greatly increased yield. Another object is to provide novel chemical compounds which are useful intermediates in the synthetic production of vitamin $K_1$ and its derivatives and processes of preparing such intermediates. A further object of this invention is to substantially reduce the over-all time required to produce vitamin $K_1$ synthetically. Other objects will appear from the following description of the invention.

These and other objects have been realized according to the present invention by the discovery that phytol can be condensed with a 1-monocarboxylic acid ester of 2-methyl-1,4-naphthohydroquinone in the presence of certain catalysts to produce the corresponding novel 1-monocarboxylic acid ester of 2-methyl-3-phytyl-1,4-naphthohydroquinone. This reaction may be illustrated as follows:

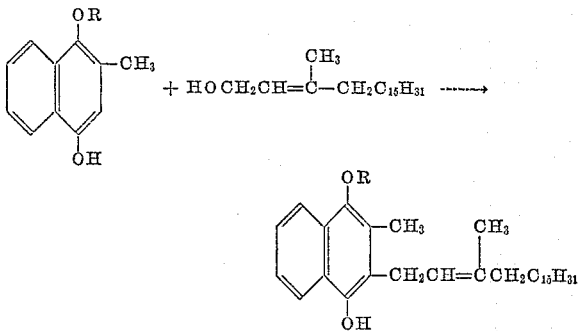

wherein R represents an acyl group.

This reaction possesses several noteworthy advantages over the prior art procedure previously described. Amongst advantages that might be mentioned are a reduction in the reaction period from 48 hours to about 6 hours in some cases, and even as little as 15 minutes. Besides reducing the reaction time, the process of this invention consistently gives yields of the desired reaction product which are in most cases about 2 times larger than those previously attained. Thus, yields by prior art methods usually average about 25% whereas with the novel process of this invention yields of 50% or more of those theoretically obtainable of the desired product are attainable.

Furthermore, the resulting novel 1-monocarboxylic acid esters of 2-methyl-3-phytyl-1,4-naphthohydroquinone can be hydrolyzed to 2-methyl-3-phytyl-1,4-naphthohydroquinone as more fully appears in copending U.S. application, Serial No. 403,638, filed January 12, 1954, and the latter compound can then be oxidized to vitamin $K_1$ by the usual procedures with substantially quantitative results.

In general, any suitable 1-monocarboxylic acid ester of 2-methyl-1,4-naphthohydroquinone can be employed as a reactant in this new process. Thus the acyloxy substituent present at the 1 position of the naphthohydroquinone nucleus may be an alkylacyloxy, arylacyloxy or aralkylacyloxy group derived from a monocarboxylic acid. Ordinarily, however, it is preferred to effect the described novel condensation using a 1-monocarboxylic acid ester of 2-methyl-1,4-naphthohydroquinone in which the acyloxy group contains 8 carbons or less. Specific examples of such compounds which can be used in this invention that might be mentioned are 2-methyl-1,4-naphthohydroquinone - 1 - acetate, 2 - methyl - 1,4 - naphthohydroquinone - 1 - propionate, 2 - methyl - 1,4 - naphthohydroquinone - 1 - butyrate, 2 - methyl - 1,4 - naphthohydroquinone - 1 - valorate, 2 - methyl - 1,4 - naphthohydroquinone - 1 caproate, 2 - methyl - 1,4 - naphthohydroquinone - 1 - caprylate, 2 - methyl - 1,4 - naphthohydroquinone - 1 - phenylacetate, 2 - methyl - 1,4 - naphthohydroquinone - 1 - benzoate and the like. These and similar esters can be prepared by the application of procedures in the literature, one source being U.S. Patent No. 2,334,669.

Pursuant to the subject invention it has been found that the condensation of a 1-monocarboxylic acid ester of 2-methyl-1,4-naphthohydroquinone with phytol to produce the corresponding 1-monocarboxylic acid ester of 2-methyl-3-phytyl-1,4-naphthohydroquinone can be brought about by the use of a suitable acidic condensing agent as catalyst. The acidic condensing agent may be more fully described as a dehydrating catalyst, i.e. a compound which is capable of splitting out water. Among such compounds which may be utilized in the reaction are those which are preferably substantially insoluble, i.e. heterogeneous, in the reaction medium, are strongly acidic and preferably have a pH of about 2 to 4.5 in water and which do not form esters with phytol. Included among the preferred dehydrating catalysts which are considered suitable for effecting this reaction that might be mentioned are alkali metal bisulfates such as sodium bisulfate and potassium bisulfate and cation exchange resins on the hydrogen cycle such as those of the phosphonic and phosphonous acid type, illustrations of which are Duolite C–60 and Duolite C–61 manufactured by Chemical Process Co., Redwood City, California.

Reaction between the 1-monocarboxylic acid ester of 2-methyl-1,4-naphthohydroquinone and phytol is conveniently achieved by contacting the reactants and catalyst in the presence of a suitable reaction medium at an elevated temperature, preferably from about 65 to 90° C. Broadly, any inert organic solvent in which the reactants are soluble may be used as the reaction medium although, since the reaction is ordinarily effected at elevated temperatures, it is desirable to employ a solvent which boils above the reaction temperature. Furthermore, to obtain the advantages of this novel process when a preferred dehydrating catalyst is used, a solvent should be employed for the reaction in which the catalyst is substantially insoluble. Solvents such as benzene, toluene, dioxane and ethylene glycol dimethyl ether are examples of suitable reaction media in which the condensation may be effected.

As previously indicated this condensation is readily effected at temperatures of 65–90° C. By carefully controlling the temperature within the range of 70–85° C. optimum conditions in terms of time and yield are realized. Within the range of 70–85° C., using a preferred dehydrating catalyst, a reaction time of 1 to 3 hours is entirely adequate whereas with lower temperatures reaction times up to 6 hours are sometimes needed. At higher temperatures the reaction goes to completion much quicker, often in about 15 minutes, but the reaction is somewhat more difficult to control.

The quantity of reactants is not critical but it has been found advantageous to use an excess of the 1-monocarboxylic acid ester of 2-methyl-1,4-naphthohydroquinone and preferably at least two and up to ten moles of this reactant to each mole of phytol. Excess starting material may be recovered unchanged by ordinary methods after the reaction has been completed. The catalyst may be employed in any concentration suitable for promoting the reaction but to insure maximum reaction large amounts should be utilized.

Following completion of the reaction the desired 1-monocarboxylic acid ester of 2-methyl-3-phytyl-1,4-naphthohydroquinone is recovered and purified. Thus, the reaction mixture may be cooled to about room temperature and filtered to remove the catalyst where the catalyst is insoluble in the reaction medium. The excess 1-monocarboxylic acid ester of 2-methyl-1,4-naphthohydroquinone used in the reaction is conveniently separated by evaporating the filtrate to a small volume and extracting the residue with low boiling petroleum ether (B.P. 30–60° C.). The excess starting material is insoluble in petroleum ether and is separated by filtration. The petroleum ether solution is extracted with dilute aqueous potassium hydroxide to remove impurities, and by evaporating the petroleum ether fraction, the desired 1-monocarboxylic acid ester of 2-methyl-3-phytyl-1,4-naphthohydroquinone is isolated.

The described condensation may be specifically illustrated by the reaction of 2-methyl-1,4-naphthohydroquinone-1-acetate with phytol in the presence of an alkali metal salt such as potassium bisulfate to form 2-methyl-3-phytyl-1,4-naphthohydroquinone-1-acetate. Similarly 2-methyl-1,4-naphthohydroquinone-1-propionate is reacted with phytol in the presence of an alkali metal bisulfate or an equivalent acidic condensing agent catalyst to produce 2 - methyl - 3 - phytyl-1,4-naphthohydroquinone-1-propionate. In a like manner starting with other appropriate reactants there is obtained 2-methyl-3-phytyl-1,4-naphthohydroquinone-1-valerate, 2 - methyl-3-phytyl-1,4-naphthohydroquinone-1-butyrate, 2-methyl-3-phytyl-1,4-naphthohydroquinone-1-caproate, 2-methyl-3-phytyl-1,4-naphthohydroquinone-1-caprylate, 2-methyl-3-phytyl-1,4-naphthohydroquinone-1-phenylacetate, 2-methyl-3-methyl - 3 - phytyl-1,4-naphthohydroquinone-1-benzoate and other similar 1-monocarboxylic acid esters of 2-methyl-3-phytyl - 1,4 - naphthohydroquinone. These compounds possess the activity of vitamin $K_1$ itself.

According to a variation upon the invention so far described, phytol and a 1-monocarboxylic acid ester of 2-methyl-1,4-naphthohydroquinone also can be condensed in the presence of boron trifluoride to produce the corresponding 1-monocarboxylic acid ester of 2-methyl-3-phytyl-1,4-naphthohydroquinone in yields of 70% and higher.

In this variation, the reaction of a 1-monocarboxylic acid ester of 2-methyl-1,4-naphthohydroquinone with phytol is conveniently achieved by contacting the reactants with boron trifluoride in the presence of a suitable reaction medium. Broadly, an inert organic solvent in which the reactants are soluble may be used as the reaction medium although it is desirable to employ a solvent which boils above the reaction temperature. Solvents such as tetrahydrofuran, dioxane, and ethylene glycol dimethyl ether are examples of suitable reaction media in which the condensation may be effected.

In effecting this variation reaction, a solution of the reactants may be conveniently contacted with boron trifluoride as a gas or, more conveniently, in the form of a complex such as a boron trifluoride etherate. Only catalytic amounts of boron trifluoride are necessary to promote the reaction.

The variation reaction proceeds at room temperature but to obtain maximum yields of the desired product in a minimum of time, elevated temperatures up to about 120° C., but preferably about 40 to 60° C., are employed. At such elevated temperatures periods of one-half hour to two hours are usually sufficient to complete the reaction.

Following completion of the reaction according to this variation, the desired 1-monocarboxylic acid ester of 2-methyl-3-phytyl-1,4-naphthohydroquinone is recovered. Thus, the reaction mixture first may be diluted with ether and washed with aqueous sodium bicarbonate to remove the boron trifluoride. After washing with water, the ether solution may then be dried, e.g. over magnesium sulfate. The product is then readily isolated by evaporating the ethereal solution to dryness under reduced pressure. The product may be purified further by triturating it with low boiling petroleum ether, extracting the petroleum ether solution with dilute aqueous potassium hydroxide, washing the petroleum ether extract with water, drying it and evaporating the petroleum ether to isolate the product.

The described condensation according to this variation may be specifically illustrated by the reaction of 2-methyl-1,4-naphthohydroquinone-1-acetate with phytol in the presence of boron trifluoride to form 2-methyl-3-phytyl-1,4-naphthohydroquinone-1-acetate. Similarly, 2-methyl-1,4-naphthohydroquinone-1-propionate is reacted with phytol in the presence of boron trifluoride to produce 2-methyl-3-phytyl-1,4-naphthohydroquinone-1-propionate. In a like manner but starting with other appropriate reactants, there is obtained 2-methyl-3-phytyl-1,4-naphthohydroquinone-1-valerate, 2-methyl-3-phytyl-1,4-naphthohydroquinone-1-butyrate, 2-methyl-3-phytyl-1,4-naphthohydroquinone-1-caproate, 2-methyl-3-phytyl-1,4-naphthohydroquinone-1-caprylate, 2-methyl-3-phytyl-1,4-naphthohydroquinone-1-phenylacetate, 2-methyl-3-phytyl-1,4-naphthohydroquinone-1-benzoate and other similar 1-monocarboxylic acid esters of 2-methyl-3-phytyl-1,4-naphthohydroquinone which possess vitamin $K_1$ like activity.

These 1-monocarboxylic acid esters of 2-methyl-3-phytyl-1,4-naphthohydroquinone prepared in accordance with the present invention may be converted to vitamin $K_1$ as more fully appears in copending U.S. application Serial No. 403,638, filed January 12, 1954. In the first step of the conversion, the 1-monocarboxylic acid ester of 2-methyl-3-phytyl-1,4-naphthohydroquinone is dissolved in a suitable solvent such as low boiling petroleum ether and the resulting solution is extracted with Claisen's alkali. In this manner, purification and unexpected solvolysis of the acyl group is achieved simultaneously to give an alkaline solution of essentially pure 2-methyl-3-phytyl-1,4-naphthohydroquinone. To separate the product, the resulting alkaline solution is diluted with 3% aqueous sodium hydrosulfite and extracted with ethyl ether. The ethyl ether solution of 2-methyl-3-phytyl-1,4-naphthohydroquinone is treated with an oxidizing agent such as silver oxide to produce 2-methyl-3-phytyl-1,4- naphthoquinone or vitamin $K_1$. The vitamin is conveniently isolated, after removal of solids from the reaction mixture, by evaporating the solvent.

The following examples are added to illustrate specific applications of the invention when using the preferred dehydrating catalysts as well as boron trifluoride, but it should be recognized that the scope of the invention is not to be restricted to the particular embodiments of the invention as disclosed in these examples, nor to the particular acidic condensing agent employed.

EXAMPLE 1

*2-Methyl-3-Phytyl-1,4-Naphthohydroquinone-1-Acetate*

To 15 ml. of dioxane is added 1.48 g. of phytol, 6.03 g. of 2-methyl-1,4-naphthohydroquinone-1-acetate and 3.02 g. of ground potassium acid sulfate. After stirring to effect solution of the organic compounds, the mixture is heated at about 75° C. for one hour and twenty minutes. The reaction mixture is then cooled to room temperature and filtered to remove the catalyst. The filtrate is evaporated under reduced pressure to a thin slurry, low boiling petroleum ether is added and the mixture is cooled in an ice bath. The mixture is filtered and the petroleum ether filtrate is extracted with 2% aqueous potassium hydroxide. The petroleum ether solution is evapoarted to dryness under reduced pressure to obtain 2-methyl-3-phytyl-1,4-naphthohydroquinone-1-acetate.

The product of this example is converted to vitamin $K_1$ as follows:

The 2-methyl-3-phytyl - 1,4 - naphthohydroquinone - 1-acetate is added to petroleum ether and the resulting solution is extracted under nitrogen with 50 ml. of Claisen's alkali (prepared by dissolving 17.5 g. of potassium hydroxide in 12.5 ml. of water and diluting to 50 ml. with methanol). The aqueous alkaline solution is diluted with a 3% aqueous solution of sodium hydrosulfite, the mixture is extracted with ethyl ether and the ether extract is dried over magnesium sulfate. After concentrating the solution to a small volume 2.0 g. of silver oxide and 2.0 g. of magnesium sulfate are added to the ethereal solution followed by shaking for 30 minutes. After filtering, the desired vitamin $K_1$ is recovered by evaporating the filtrate to dryness under reduced pressure.

EXAMPLE 2

*2-Methyl-3-Phytyl-1,4-Naphthohydroquinone-1-Propionate*

To 16 ml. of dioxane is added 1.48 g. of phytol, 11.60 g. of 2-methyl-1,4 - naphthohydroquinone - 1-propionate and 3.02 g. of freshly ground potassium acid sulfate. The mixture is heated under nitrogen at 76° C. for one hour and twenty minutes. After cooling to room temperature the reaction mixture is filtered to remove the catalyst. The filtrate is evaporated under reduced pressure until very little solvent remains. To the residue is added 27 ml. of petroleum ether (B.P. 30–60° C.). After cooling for one hour in the refrigerator, excess starting material is removed by filtration and the filtrate is extracted with 2% aqueous potassium hydroxide containing a small amount of sodium hydrosulfite. The petroleum ether layer is evaporated under reduced pressure to give 2-methyl-3-phytyl-1,4-naphthohydroquinone-1-propionate.

The 2-methyl-3-phytyl - 1,4-naphthohydroquinone-1-propionate is added to 30 ml. of petroleum ether and shaken vigorously with 50 ml. of Claisen's alkali containing 3.0 ml. of aqueous sodium hydrosulfite. The alkaline extract is separated and added to a mixture of 200 ml. of cold 3% aqueous sodium hydrosulfite and 100 ml. of ether. The ether layer is separated and dried over anhydrous magnesium sulfate. The ether solution of 2-methyl-3-phytyl-1,4,-naphthohydroquinone is evaporated to about 10–25 ml. and to it is added 2.08 g. of silver oxide in the presence of magnesium sulfate. The mixture is filtered and by evaporating the filtrate under reduced pressure to remove the solvent there is obtained 2-methyl-3-phytyl-1,4-naphthoquinone.

EXAMPLE 3

*2-Methyl-3-Phytyl-1,4-Naphthohydroquinone-1-Butyrate*

1.480 gm. of phytol, 11.60 g. of 2-methyl-1,4-naphthohydroquinone-1-butyrate and 3.02 g. of sodium acid sulfate is added to 20 ml. of toluene and the mixture is stirred well. The mixture is then heated at 80° C. for one hour, cooled and filtered. The toluene solution is evaporated to a small volume, triturated, with petroleum ether, cooled and filtered. The petroleum ether filtrate is purified by extraction with 2% aqueous potassium hydroxide. The desired 2-methyl - 3-phytyl - 1,4-naphthohydroquinone-1-butyrate is recovered by evaporating the ether under reduced pressure.

The procedure of this example is repeated starting with 2-methyl-1,4-naphthohydroquinone-1-valerate and reacting it with phytol to form 2-methyl-3-phytyl-1,4-naphthohydroquinone - 1-valerate. Similarly, other 1-monocarboxylic acid esters of 2-methyl - 1,4 - naphthohydroquinone such as the caproate, caprylate and phenylacetate are reacted with phytol in the presence of an acidic salt such as an alkali metal acid sulfate to produce the corresponding 2-methyl-3 - phytyl-1,4-naphthohydroquinone-1-caproate, 1-caprylate and 1-phenylacetate.

EXAMPLE 4

*2-Methyl-3-Phytyl-1,4-Naphthohydroquinone-1-Benzoate*

To 25 ml. of benzene is added 3 g. of 2-methyl-1,4-naphthohydroquinone-1-benzoate, 1 g. of phytol and 2 g. of potassium acid sulfate. The mixture is refluxed for 2 hours, cooled and filtered. The benzene filtrate is reduced to a small volume by evaporation and low boiling petroleum ether is added to the remaining solution. The mixture is cooled, filtered and the filtrate is extracted with 2% aqueous potassium hydroxide. The petroleum ether solution is evaporated to dryness to obtain 2-methyl-3-phytyl - 1,4 - naphthohydroquinone-1-benzoate.

EXAMPLE 5

*2-Methyl-3-Phytyl-1,4-Naphthohydroquinone-1-Propionate*

11.6 g. of 2-methyl-1,4 - naphthohydroquinone-1-propionate and 3.08 g. of Duolite C–60, a cation exchange resin on the hydrogen cycle, are added to 16 ml. of dioxane and the mixture heated to 75° C. Then 1.58 g. of phytol in 4 ml. of dioxane is added over a 1 hour period. After the addition of phytol has been completed, heating is continued for 20 minutes more. The reaction mixture is cooled to room temperature, filtered and the filtrate is reduced to a small volume by evaporation under reduced pressure. Low boiling petroleum ether is added to the residue, the mixture is cooled and filtered. The filtrate is extracted with 2% aqueous potassium hydroxide containing a small amount of sodium hydrosulfite. The petroleum ether layer is evaporated to isolate the 2-methyl-3-phytyl-1,4-naphthohydroquinone-1-proprionate.

EXAMPLE 6

*2-Methyl-3-Phytyl-1,4-Naphthohydroquinone-1-Acetate*

To 20 ml. of dioxane is added 2.1 g. of phytol, 9.2 g. of 2-methyl-1,4-naphthohydroquinone-1-acetate and 0.30 ml. of boron trifluoride-etherate. After solution is effected the mixture is heated at about 50° C. for one hour and twenty minutes under nitrogen. The reaction mixture is then cooled to room temperature and diluted with ether. The ethereal solution is extracted with 2% aqueous potassium hydroxide and washed with water. The ethereal solution is evaporated to dryness under reduced pressure to obtain 2-methyl-3-phytyl-1,4-naphthohydroquinone-1-acetate.

The product of this example is converted to vitamin $K_1$ as follows.

The 2-methyl-3-phytyl-1,4-naphthohydroquinone-1-acetate is added to petroleum ether and the resulting solution is extracted under nitrogen with 50 ml. of Claisen's methanolic alkali (prepared by dissolving 17.5 g. of potassium hydroxide in 12.5 ml. of water and diluting to 50 ml. with methanol). The aqueous alkaline solution is diluted with a 3% aqueous solution of sodium hydrosulfite, the mixture is extracted with ethyl ether and the ether extract is dried over magnesium sulfate. After concentrating the solution to a small volume, 3.0 g. of silver oxide and 3.0 g. of magnesium sulfate are added to the ethereal solution followed by shaking for 30 minutes. After filtering, the desired vitamin $K_1$ is recovered by evaporating the filtrate to dryness under reduced pressure.

EXAMPLE 7

*2-Methyl-3-Phytyl-1,4-Naphthohydroquinone-1-Propionate*

1.481 g. of phytol in 4.0 ml. of dry oxane is added dropwise over a 30 minute interval at 50° C. to 11.65 g. of 2-methyl-1,4-naphthohydroquinone-1-monopropionate in 10.0 ml. of dry dioxane to which about 0.22 ml. of boron trifluoride etherate has been added. During the addition the reaction temperature is maintained at about 52° C. and the condensation is effected under an inert atmosphere. Stirring is continued with heating until the total reaction time is about 1 hour.

The reaction mixture is cooled to room temperature and diluted with 60 ml. of ether. The mixture is washed with sodium bicarbonate and then with water. The ethereal solution is dried over magnesium sulfate and evaporated to dryness. The residue is triturated with petroleum ether and cooled. The solution is filtered and the filtrate is extracted with 2% aqueous potassium hydroxide to remove any remaining unreacted starting material. The petroleum ether solution of 2-methyl-3-phytyl-1,4-naphthohydroquinone-1-propionate is then extracted with Claisen's alkali and the aqueous alkaline solution is diluted with a 3% aqueous solution of sodium hydrosulfite. The mixture is extracted with ethyl ether and the ether extract is dried over magnesium sulfate. The ethereal solution is concentrated to a small volume. 3.0 g. of silver oxide and 3.0 g. of magnesium sulfate are added to the ethereal solution and the mixture is shaken for 20 minutes and filtered. The filtrate is evaporated to dryness to give 1.6 g. of vitamin $K_1$ in a 70% yield.

EXAMPLE 8

*2-Methyl-3-Phytyl-1,4-Naphthohydroquinone-1-Butyrate*

1.480 g. of phytol, 5.3 g. of 2-methyl-1,4-naphthohydroquinone-1-butyrate and 0.40 g. of boron trifluoride etherate is added to 20 ml. of toluene and the mixture is stirred well. The mixture is then heated at 55° C. for one hour, cooled and filtered. The toluene solution is evaporated to a small volume and diluted with ether. The ethereal solution is purified by extraction with 2% aqueous potassium hydroxide and washing with water. The desired 2-methyl-3-phytyl-1,4-naphthohydroquinone-1-butyrate is recovered by evaporating the ether under reduced pressure.

The procedure of this example is repeated starting with 2-methyl-1,4-naphthohydroquinone-1-valerate and reacting it with phytol in the presence of boron trifluoride to form 2-methyl-3-phytyl-1,4-naphthohydroquinone-1-valerate. Similarly, other 1-monocarboxylic acid esters of 2-methyl-1,4-naphthohydroquinone such as the caproate, caprylate and phenylacetate are reacted with phytol in the presence of boron trifluoride to produce the corresponding 2-methyl-3-phytyl-1,4-naphthohydroquinone-1-caproate, 1-caprylate and 1-phenylacetate.

EXAMPLE 9

*2-Methyl-3-Phytyl-1,4-Naphthohydroquinone-1-Benzoate*

To 20 ml. of benzene is added 2.5 g. of 2-methyl-1,4-naphthohydroquinone-1-benzoate, 0.80 g. of phytol and 0.25 g. of borontrifluoride-etherate. The mixture is heated at 45° C. for two hours and then cooled to room temperature. The benzene solution is extracted with 2% aqueous potassium hydroxide and washed with water. The benzene solution is evaporated to dryness to obtain 2-methyl-3-phytyl-1,4-naphthohydroquinone-1-benzoate.

Various changes and modifications of the invention can be made and, to the extent that such variations incorporate the spirit of this invention, they are intended to be included within the scope of the appended claims.

I claim:

1. The process which comprises reacting a 1-monocarboxylic acid ester of 2-methyl-1,4-naphthohydroquinone in which the acyl group is derived from a monocarboxylic acid having from one to and including eight carbon atoms, with phytol in an inert organic solvent in the presence of an alkali metal bisulfate to produce the corresponding 1-monocarboxylic acid ester of 2-methyl-3-phytyl-1,4-naphthohydroquinone.

2. The process according to claim 1 wherein the alkali metal bisulfate is potassium bisulfate.

References Cited in the file of this patent

UNITED STATES PATENTS 2,839,570    Lindlar  _____ June 17, 1958